(12) United States Patent
Kiyokawa

(10) Patent No.: US 7,068,242 B2
(45) Date of Patent: Jun. 27, 2006

(54) HEAD-MOUNTED AUDIO/VIDEO PLAYBACK SYSTEM

(75) Inventor: Izuru Kiyokawa, Machida (JP)

(73) Assignee: Olympus Optical Co., Ltd., Tokyo (JP)

( * ) Notice: Subject to any disclaimer, the term of this patent is extended or adjusted under 35 U.S.C. 154(b) by 307 days.

(21) Appl. No.: 10/380,814

(22) PCT Filed: Feb. 1, 2002

(86) PCT No.: PCT/JP02/00827

§ 371 (c)(1),
(2), (4) Date: Mar. 18, 2003

(87) PCT Pub. No.: WO02/063873

PCT Pub. Date: Aug. 15, 2002

(65) Prior Publication Data

US 2004/0021619 A1    Feb. 5, 2004

(30) Foreign Application Priority Data

Feb. 6, 2001    (JP) .............................. 2001-029960

(51) Int. Cl.
    *G09G 5/00*    (2006.01)

(52) U.S. Cl. ............................ 345/8; 359/13; 381/371; 348/53

(58) Field of Classification Search ................ 345/7–9; 359/13; 381/370, 371; 548/53
See application file for complete search history.

(56) References Cited

U.S. PATENT DOCUMENTS

| | | | | |
|---|---|---|---|---|
| 5,457,751 A | * | 10/1995 | Such ........................... | 381/375 |
| 5,604,813 A | * | 2/1997 | Evans et al. ................ | 381/71.6 |
| 5,815,126 A | | 9/1998 | Fan et al. | |
| 5,966,671 A | * | 10/1999 | Mitchell et al. .......... | 455/550.1 |
| 6,034,653 A | * | 3/2000 | Robertson et al. ............. | 345/8 |
| 6,480,174 B1 | * | 11/2002 | Kaufmann et al. ............ | 345/8 |
| 6,747,611 B1 | * | 6/2004 | Budd et al. ..................... | 345/7 |

FOREIGN PATENT DOCUMENTS

| | | |
|---|---|---|
| EP | 0 942 307 A2 | 9/1999 |
| JP | 9-504120 | 4/1997 |
| JP | 10-293544 | 11/1998 |
| JP | 2000-066618 | 3/2000 |
| JP | 2000-111828 | 4/2000 |
| WO | WO 95/11473 | 4/1995 |

* cited by examiner

*Primary Examiner*—Amr A. Awad
*Assistant Examiner*—Tom Sheng
(74) *Attorney, Agent, or Firm*—Frishauf, Holtz, Goodman & Chick, P.C.

(57) ABSTRACT

A head-mounted audio/video playback system is provided which includes a main-body unit functioning as a pair of headphones worn on the head for playing back audio, to which a video playback unit having a video playback function, a battery unit having a power supplying function, and a protective cover are detachably connected. The main-body unit can be used alone, the video playback unit can be connected to only one of a left case and a right case of the main-body unit, or the video playback unit can be connected to one of the left case and the right case and the battery unit can be connected to the other.

4 Claims, 3 Drawing Sheets

HEAD-MOUNTED AUDIO/VIDEO PLAYBACK SYSTEM

This application is a U.S. National Phase of International Application No. PCT/JP02/00827 filed on Feb. 1, 2002.

TECHNICAL FIELD

The present invention relates to a head-mounted audio/video playback system. More specifically, the present invention relates to a head-mounted audio/video playback system that can playback audio in a left speaker and a right speaker and can playback video on a display element as required.

BACKGROUND ART

In recent years, various kinds of head-mounted video display apparatuses that can be mounted on the head and that allow both audio and video to be enjoyed have been proposed and become available for sale. The weight of head-mounted video display apparatuses is reduced to a minimum, so that they can be used unobtrusively when they are mounted on the head.

In such head-mounted video display apparatuses, the weight of parts for displaying video can be reduced by, for example, putting some thought into the optical system thereof, and the weight of parts for listening to audio is reduced by adopting a pair of in-the-ear phones that are inserted into the ears when used. For example, a binocular head-mounted video display apparatus is disclosed in Japanese Unexamined Patent Application Publication No. 10-293544.

On the other hand, various kinds of headphones for enjoying audio such as music have been used, such as the above-described in-the-ear phones, open-air headphones whose weight is reduced so that they can be connected to a portable audio playback apparatus, airtight headphones that are highly sophisticated for fine audio perception, and so forth. Of these headphones, the highly-sophisticated airtight headphones comprise housings producing sound effects, ear pads shutting out outside sounds by covering the edge of each housing on the side contacting the ear, and so forth. Further, the highly-sophisticated airtight headphones often include a large-diameter speaker. Therefore, in general, the size and weight of the highly-sophisticated airtight headphones tend to be larger.

As well as listening to music alone, on the music scene in recent years, there has been an increasing tendency to enjoy video that is produced to match with music, notably, for example, promotional videos.

However, these known headphones cannot be used to watch such video per se. Therefore, a separate video display apparatus should be used for enjoying the video. For portable use in particular, a hand-size DVD video playback apparatus, for example, comprising a small liquid display element or the like may be connected. However, in such a case, the video that is observed while listening to the audio is displayed on a small screen. Therefore, even though the audio is of high quality and has a sense of realism, the video is not as realistic as the audio.

On the other hand, even though the above-described known head-mounted video playback apparatus allows a large screen image to be observed, the audio playback function is not very advanced. Therefore, the head-mounted video playback apparatus is somewhat inadequate for fully enjoying music.

Subsequently, it has been considered that the head-mounted video playback apparatus may comprise a large headphone-type audio playback apparatus instead of the in-the-ear phones. However, in this case, the overall size and weight of the head-mounted video playback apparatus are increased, whereby the lightness and portability thereof are decreased.

Accordingly, there is a demand for an apparatus that places importance on high-quality audio and that allows video to be viewed easily.

To this end, the present invention is provided. The object of the present invention is to provide a head-mounted audio/video playback system that allows for listening to high-quality video and that allows video to be easily viewed as required.

SUMMARY OF THE INVENTION

A first invention is a head-mounted audio/video playback system comprising a main-body unit comprising a left case comprising a left speaker and a unit-connection terminal provided with a plurality of electrical terminals, a right case comprising a right speaker and a unit-connection terminal having the same configuration as the unit-connection terminal of the left case, a coupling unit for integrally coupling the left case and the right case, a left audio-signal transmission line for transmitting a left audio signal, which is supplied to the left speaker, a right audio-signal transmission line for transmitting a right audio signal, which is supplied to the right speaker, and an video-signal transmission line, connected to the electrical terminals included in the unit-connection terminal of the left case and the electrical terminals included in the unit-connection terminal of the right case, for transmitting a video signal. The head-mounted audio/video playback system further comprises a video playback unit that can be removably connected to either the left case or the right case of the main-body unit. The video playback unit comprises a display element for displaying images, a connection element that can be connected to the unit-connection terminals, and display-element driving means for driving the display element according to a video signal input from the connection element. When the video playback unit is connected to the left case, the display element is positioned in front of the left eye of a user. When the video playback unit is connected to the right case, the display element is positioned in front of the right eye of the user.

In a second invention according to the first invention, the unit-connection terminal of the left case and the unit-connection terminal of the right case each include an electrical terminal for detecting left/right unit mounting position. The video playback unit further comprises control means for determining whether the video playback unit is connected to the left case or the right case by detecting the electrical terminal for detecting left/right unit mounting position and for controlling the display-element driving means according to the determination result so that an image displayed on the display element is properly oriented vertically and horizontally.

A third invention according to the second invention further comprises a battery unit comprising a battery, and a connection terminal that can be connected to the unit-connection terminal and can supply power from the battery. The main-body unit can be used alone, the video playback unit can be connected to only one of the left case and the right case of the main-body unit, or the video playback unit can be connected to one of the left case and the right case of the main-body unit and the battery unit can be connected to the other.

In a fourth invention according to the third invention, the main-body unit further comprises a power-supply line, connected to the electrical terminals of the unit-connection terminal of the left case and the electrical terminals of the unit-connection terminal of the right case, for supplying power. The video playback unit further comprises an input power switching circuit that detects whether or not the power-supply line can supply power and whether or not the battery unit can supply power. When both of them can supply power, the input power switching circuit stops the power supplied from the battery unit, and allows the power to be supplied only from the power-supply line.

DETAILED DESCRIPTION

Embodiments of the present invention will now be described with reference to the drawings.

Figure 1:
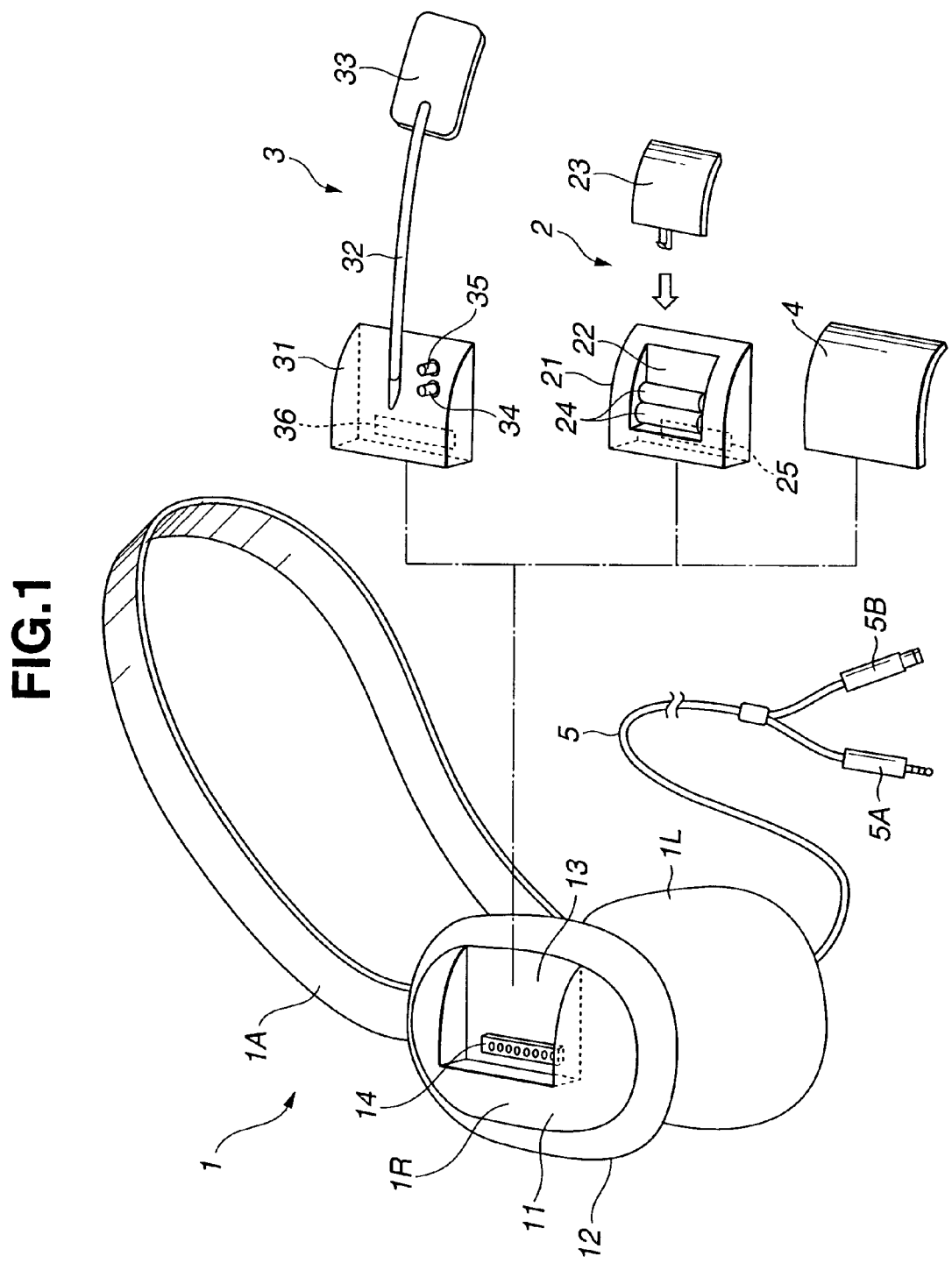
FIG. 1 is a perspective view of the configuration of a head-mounted audio/video playback system according to an embodiment of the present invention.
Figure 2:
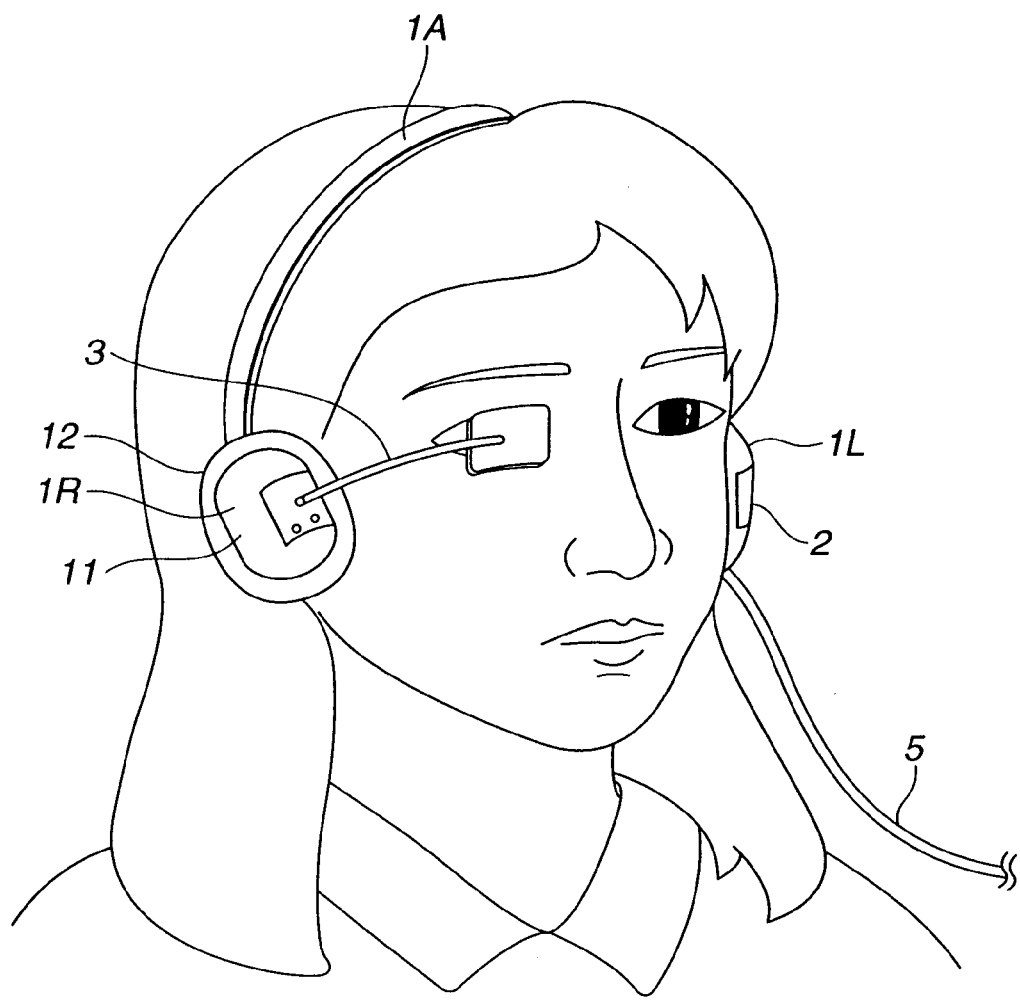
FIG. 2 illustrates the head-mounted audio/video playback system according to the embodiment when worn and used.
Figure 3:
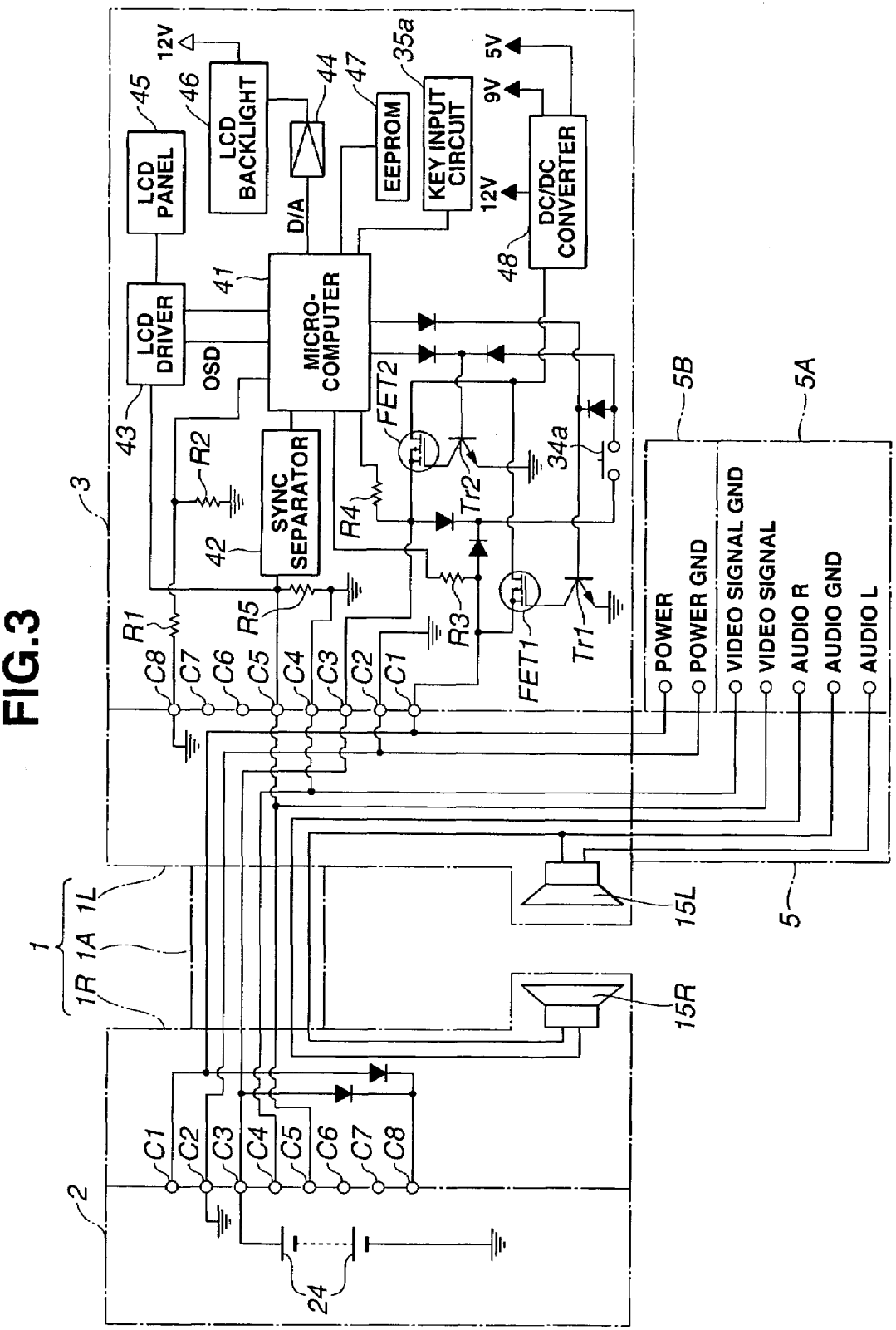
FIG. 3 is a block diagram that illustrates the electrical configuration of the head-mounted audio/video playback system according to the embodiment.

FIGS. 1 to 3 illustrate an embodiment of the present invention. FIG. 1 is a perspective view of the configuration of a head-mounted audio/video playback system. FIG. 2 illustrates the head-mounted audio/video playback system when worn and used. FIG. 3 illustrates the electrical configuration of the head-mounted audio/video playback system.

As shown in FIG. 1, the head-mounted audio/video playback system is formed as a system comprising a main-body unit 1 functioning as a pair of headphones worn on the head for playing back audio to which a video playback unit 3 having a video playback function and a battery unit 2 having a power supplying function are detachably connected. When the video playback unit 3 or the battery unit 2 is not connected, a protective cover 4 may be attached for preventing dust from entering therein and for protecting the connection points.

According to the above-described configuration of the head-mounted audio/video playback system, the main-body unit 1 may be used alone, or the video playback unit 3 may be connected to either a left case 1L or a right case 1R of the main-body unit 1. Alternatively, the video playback unit 3 may be connected to one of the left case 1L and the right case 1R of the main-body unit 1, and the battery unit 2 may be connected to the other.

Thus, the video playback unit 3 can be connected to either the left case 1L or the right case 1R as desired, according to the preference of the user, that is, to either the right eye or the left eye, whichever one the user tends to use more often than the other.

Similarly, the battery unit 2 can be connected to one of the left case 1L and the right case 1R as desired, that is, the one to which the video playback unit 3 is not connected.

For example, FIG. 2 illustrates a case where the user uses the head-mounted audio/video playback system, wherein the video playback unit 3 is attached to the right case 1R and the battery unit 2 is attached to the left case 1L.

The main-body unit 1 comprises the left case 1L including a speaker 15L for the left (see FIG. 3), which will be described later, and the right case 1R including a speaker 15R for the right (see FIG. 3), which will be described later. The left case 1L and the right case 1R are coupled and integrated by a coupling unit 1A that can also be used as a headband for holding the main-body unit 1 near the head.

The main-body unit 1 is formed as, e.g., a pair of airtight headphones that substantially cover the ears of the user, or a pair of open-air headphones that cover relatively large parts of the ears of the user. The left case 1L and the right case 1R each comprise a housing 11 including the above-described speaker and an ear-pad 12 on one side of the housing 11 in contact with the user.

A unit-mounting part 13 is provided in each of the housings 11 of the left case 1L and the right case 1R. In each of the unit-mounting parts 13, a unit-connection terminal 14 having a plurality of electrical terminals is provided. The unit-connection terminal 14 provided in the left case 1L and the unit-connection terminal 14 provided in the right case 1R are formed in the same shape as one another. That is to say, when the unit-connection terminal 14 of the left case 1L has, for example, eight electrical terminals C1 to C8 (see FIG. 3) that are aligned in sequence from below, the unit-connection terminal 14 of the right case 1R has eight electrical terminals C1 to C8 (see FIG. 3) that are aligned in sequence from above.

A cord 5 extends from the left case 1L. The cord 5 branches in two at some midpoint. Then, a 5-pole AV plug 5A for receiving video signals and audio signals is provided at one end of the cord 5, and a power plug 5B for receiving power from a DC power supply is provided at the other end thereof.

The video playback unit 3 comprises a main-body unit 31 including a circuit board. A microcomputer 41, an LCD driver 43, and so forth (see FIG. 3), which will be described later, are mounted on the circuit board. The video playback unit 3 further comprises an LCD backlight 46 and an LCD panel 45 (see FIG. 3), which will be described later. The video playback unit 3 further comprises a display unit 33. In the display unit 33, an optical system or the like for projecting an image displayed on the LCD panel 45 onto the eye of the user is provided. The video playback unit 3 further comprises a holding member 32 extending from the main-body unit 31 so that the display unit 33 can be positioned in front of the eye of the user. The main-body unit 31 comprises a power button 34 for turning ON/OFF the power supply, an operation key 35 for, e.g., selecting items displayed on the screen, and a connection terminal 36 for connection to the unit-connection terminal 14.

The battery unit 2 is provided for supplying power to the video playback unit 3 for so-called portable use. The battery unit 2 comprises a container 21 having a load chamber 22 for removably storing batteries 24, that is, a primary battery and a secondary battery, such as lithium-ion batteries or the like. The battery unit 2 further comprises a battery cover 23 for covering the load chamber 22, and a connection terminal 25 for connection to the unit-connection terminal 14 of the main-body unit 1.

The electrical configuration of the above-described head-mounted audio/video playback system will now be described with reference to FIG. 3. In this system, the battery unit 2 is connected to the right case 1R of the main-body unit 1, and the video playback unit 3 is connected to the left case 1L.

From the 5-pole AV plug 5A, wires are connected for inputting a video signal, a video signal GND, a right audio-signal (Audio R), a left audio-signal (Audio L), and an audio signal GND (Audio GND).

Further, from the power plug 5B, wires are connected for inputting power and power GND.

The above-described seven wires, such as a video signal wire that is a video-signal transmission wire, a video signal GND wire, a right audio-signal (Audio R) wire that is a right audio-signal transmission wire, a left audio-signal (Audio L) wire that is a left audio-signal transmission wire, an audio-signal GND (Audio GND) wire, a power wire that is a power supply wire, and a power GND wire are provided in the left case 1L via the cord 5 and are then provided in the right case 1R via the coupling unit 1A.

In the left case 1L and the right case 1R, the speakers 15L and 15R, which have relatively large diameters and which are high-performance speakers, are provided, respectively. The left audio-signal (Audio L) wire and the audio-signal GND (Audio GND) wire are connected to the speaker 15L, and the right audio-signal (Audio R) wire and the audio-signal GND (Audio GND) wire are connected to the speaker 15R.

In the unit-connection terminal 14 of the right case 1R, the power wire is connected to the electrical terminal C1, the power GND wire is connected to the electrical terminal C2, the video-signal GND wire is connected to the electrical terminal C4, the video-signal wire is connected to the electrical terminal C5, and an input wire from the electrical terminals C1 and C3 is connected to the electrical terminal C8.

The electrical terminal C3 is connected to the electrical terminal C3 of the left case 1L. A diode is provided at some midpoint of the wire connecting the electrical terminal C8 with the electrical terminal C3, and at some midpoint of the wire connecting the electrical terminal C8 with the electrical terminal C1. Therefore, the electrical terminal C8 becomes a connection point for receiving inputs only from the above-described connection points.

Further, the electrical terminals C6 and C7 can be used for other connections that are not shown, or they can be used as connection points reserved for future expansion.

In the battery unit 2 that is connected to the left case 1L, the power from the battery 24 is supplied via the electrical terminal C3, and ground is connected to the electrical terminal C2.

In the unit-connection terminal 14 of the left case 1L, the power wire is connected to the electrical terminal C1, the power GND wire is connected to the electrical terminal C2, the electrical terminal C3 of the right case 1R is connected to the electrical terminal C3, as described above, the video-signal GND wire is connected to the electrical terminal C4, and the video-signal wire is connected to the electrical terminal C5. Unlike the above-described right case 1R, the electrical terminal C8 is grounded.

Further, as in the case of the above-described right case 1R, the electrical terminals C6 and C7 of the left case 1L can be used for other connections that are not shown, or they can be used as connection points reserved for future expansion.

The video playback unit 3 connected to the left case 1L comprises a sync separator 42 for separating a synchronizing signal from the input video signal, a microcomputer 41, which functions as control means for controlling the video playback unit 3, an LCD panel 45, which functions as a display element for displaying images, an LCD driver 43, which functions as display-element driving means for driving the LCD panel 45 according to a video signal, an LCD backlight 46 for illuminating the LCD panel 45, an amplifier 44 for amplifying and supplying a signal that is output from the microcomputer 41 and converted into analog form to the LCD backlight 46, an EEPROM 47 for storing various kinds of data or the like used by the microcomputer 41, a key input circuit 35a for transmitting to the microcomputer 41 an output according to the operation of the operation key 35, an input power switching circuit for switching between power supplied from the batteries 24 and power supplied from the power plug 5B according to the connection state, and a DC/DC converter 48 for converting DC power supplied from the input power switching circuit into voltages (for example, voltages of 12 V, 9 V, and 5 V) suitable to the circuits (output destinations) in the video playback unit 3 and supplying those voltages.

First, the electrical terminal C8 is connected to the microcomputer 41 via a resistor R1. A connection wire for interconnecting the resistor R1 and the microcomputer 41 is grounded via a resistor R2.

When the video playback unit 3 is connected to the left case 1L in such a configuration, the electrical terminal C8 is connected to ground. Subsequently, the microcomputer 41 detects that the signal level is low.

On the other hand, when the video playback unit 3 is connected to the right case 1R, the electrical terminal C8 is supplied with power by either the electrical terminal C1, to which the power wire from the power plug 5B is connected, or the electrical terminal C3 connected to the batteries 24 in the battery unit 2 mounted on the other case, that is the left case 1L. Subsequently, the microcomputer 41 detects that the signal level is high.

Thus, the microcomputer 41 performs detection at the electrical terminal C8. When the result is low, the microcomputer 41 determines that the video playback unit 3 is connected to the left case 1L. When the result is high, the microcomputer 41 determines that the video playback unit 3 is connected to the right case 1R.

The electrical terminal C4 is connected to ground, as described above, and is connected to the electrical terminal C5, to which the video signal is input, via a resistor R5 in the video playback unit 3.

The video signal input from the electrical terminal C5 is input to the LCD driver 43. Also, the video signal is input to the sync separator 42. Then, a synchronizing signal is extracted and input to the microcomputer 41.

The microcomputer 41 controls the LCD driver 43 so that the display on the LCD panel 45 is in the proper orientation according to the detection result at the electrical terminal C8, that is, according to whether the video playback unit 3 is connected to the left case 1L or the right case 1R.

That is to say, if an image, obtained when the video playback unit 3 is connected to one of the left case 1L and the right case 1R, were displayed in the same way when the video playback unit 3 is connected to the other, the image would be reversed left to right and upside down (that is to say, the image would be rotated by 180 degrees) for the user. Consequently, the microcomputer 41 controls the LCD driver 43 according to which case the video playback unit 3 is connected to, so that the image is displayed in the proper orientation in vertical and horizontal directions.

The LCD driver 43 includes a buffer for one complete screen corresponding to pixels of the LCD panel 45. The microcomputer 41 designates buffer addresses, used for writing information of each pixel in the buffer, in either the normal direction or the reverse direction, in sequence, according to the input synchronizing signal. Consequently, the microcomputer 41 can perform, for example, control for rotating the display on the LCD panel 45 by 180 degrees.

Further, the microcomputer 41 can control the LCD backlight 46. As has been described, the signal output from the microcomputer 41 and converted into analog form is amplified by the amplifier 44 and is supplied to the LCD backlight 46 for illuminating the LCD panel 45. The DC/DC converter 48 supplies a voltage of 12 V to the LCD panel 45.

Further, when the power button 34 is pressed and the DC/DC converter 48 starts supplying power, as will be described later, the microcomputer 41 performs initialization processing on startup, subsequent control processing, and so forth in a predetermined processing routine. Then, the microcomputer 41 reads message information that is displayed at startup, other warnings, and so forth from the EEPROM 47. Further, the microcomputer 41 outputs to the LCD driver 43 an on-screen display (OSD) signal according to the message information for displaying the message or the like on the LCD panel 45.

The input power switching circuit will now be described.

The input power switching circuit may be configured in various forms. However, in the example shown in FIG. 3, the input power switching circuit comprises a power switch 34a, field effect transistors FET1 and FET2, transistors Tr1 and Tr2, resistors R3 and R4, a plurality of diodes, and so forth.

The effect of switching between the power supplied from the battery unit 2 and the power supplied from the power plug 5B, which is obtained by using the above-described input power switching circuit, will now be described.

First, a case where the battery unit 2 is connected and the power plug 5B is connected to the power will be described.

The power input from the electrical terminal C1 and the power input from the electrical terminal C3 can reach a connection point at one end of the power switch 34a via diodes or the like for preventing a current from flowing in the reverse direction. The power switch 34a switches between ON and OFF according to the operation of the power button 34.

When the power switch 34a is turned on, the current reaches the bases of the transistors Tr1 and Tr2 via the diodes or the like and turns on the transistors Tr1 and Tr2.

Consequently, the field effect transistors FET1 and FET2 are turned on, and power is supplied to the DC/DC converter 48. Then, the DC/DC converter 48 supplies power to the circuits.

Subsequently, the microcomputer 41 starts operating.

The electrical terminal C1 is connected to the microcomputer 41 via the resistor R3, and the electrical terminal C3 is connected to the microcomputer 41 via the resistor R4. The microcomputer 41 detects whether the signal levels thereof are high or low, thereby determining whether or not external power from the power plug 5B and the battery unit 2 are connected.

In this case, however, both of these are detected. Therefore, the microcomputer transmits a control signal to the transistor Tr2, which is connected via the diode, and turns it off. Subsequently, the FET2 is turned off and the power supplied from the battery unit 2 is interrupted. The on state of the transistor Tr1, which is connected via the diode, is maintained.

Accordingly, when both the external power and the battery unit 2 are connected, only the external power is used and the battery unit 2 is not used.

Next, a case where the battery unit 2 is connected and the power plug 5B is not connected to the power will be described.

When the power switch 34a is turned on, a current supplied from the electrical terminal C3 reaches the bases of the transistors Tr1 and Tr2. However, since the electrical terminal C1 is not supplied with power, the transistor Tr1 remains off and only the transistor Tr2 is turned on.

Accordingly, the field effect transistor FET2 is turned on and the field effect transistor FET1 remains off.

Thus, the power from the electrical terminal C3 is supplied to the DC/DC converter 48, and the DC/DC converter 48 starts supplying power to the circuits. Then, the microcomputer 41 starts operating.

The microcomputer 41 detects the electrical terminals C1 and C3 and determines that only the battery unit 2 is connected. Then, the microcomputer 41 maintains the same power supplying state.

Next, a case where the battery unit 2 is not connected and the power plug 5B is connected to the power will be described.

When the power switch 34a is turned on, a current supplied from the electrical terminal C1 reaches the bases of the transistors Tr1 and Tr2. However, since the electrical terminal C3 is not supplied with power, the transistor Tr2 remains off and only the transistor Tr1 is turned on.

Accordingly, the field effect transistor FET1 is turned on and the field effect transistor FET2 remains off.

Thus, the power from the electrical terminal C1 is supplied to the DC/DC converter 48, and the DC/DC converter 48 starts supplying power to the circuits. Then, the microcomputer 41 starts operating.

The microcomputer 41 detects the electrical terminals C1 and C3 and determines that the power from the power plug 5B alone is connected. Then, the microcomputer 41 maintains the same power supplying state.

Thus, when the external power is connected, the input power switching circuit uses the external power irrespective of whether or not the battery unit 2 is connected. Only when the external power is not connected does the input power switching circuit use the power supplied from the battery unit 2.

As described above, when neither the battery unit 2 nor the video playback unit 3 is connected to the unit-mounting part 13, the protective cover 4 is attached. However, the configuration is not limited to the above-described case, and a sliding cover or the like for covering the unit-mounting part 13 as desired may be provided on the housing 11.

By using the head-mounted audio/video playback system according to the above-described embodiments, it becomes possible to listen to high-quality audio and to watch video with ease, when desired. Since the head-mounted audio/video playback system can be driven by a battery as required, it can be used outdoors. That is to say, the head-mounted audio/video playback system is suitable for so-called portable use. Further, when external power is connected, the head-mounted audio/video playback system does not use the battery. Therefore, the head-mounted audio/video playback system does not exhaust the battery unnecessarily.

The present invention is not limited to the above-described embodiments, but can be modified and applied in various forms without departing from the spirit and scope of the invention.

As has been described, the head-mounted audio/video playback system allows for listening to high-quality audio and watching video with ease, when desired.

The invention claimed is:

1. A head-mounted audio/video playback system comprising:
   (i) a main-body unit comprising:
      a left case comprising a left speaker and a recessed part in which a unit-connection terminal provided with a plurality of electrical terminals is provided;
      a right case comprising a right speaker and a recessed part in which a unit-connection terminal having a same configuration as the unit-connection terminal of the left case is provided;
      a coupling unit for integrally coupling the left case and the right case;
      a left audio-signal transmission line for transmitting a left audio signal, which is supplied to the left speaker;
      a right audio-signal transmission line for transmitting a right audio signal, which is supplied to the right speaker; and
      a video-signal transmission line, connected to the electrical terminals included in the unit-connection terminal of the left case and the electrical terminals included in the unit-connection terminal of the right case, for transmitting a video signal, and
   (ii) a video playback unit that can be removably connected to one of the left case and the right case of the main-body unit, the video playback unit comprising:
      a display element for displaying images;
      a main body adapted to be fitted into the recessed part of said one of the left case and the right case such that a connection element of the video playback unit provided on the main body is connected to the corresponding one of the unit-connection terminals; and
      display-element driving means for driving the display element according to a video signal input from the connection element,
      wherein when the display element is connected to the left case, the display element is positioned in front of a left eye of a user, and when the display element is connected to the right case, the display element is positioned in front of a right eye of the user.

2. A head-mounted audio/video playback system according to claim 1,
   wherein the unit-connection terminal of the left case and the unit-connection terminal of the right case each include an electrical terminal for detecting left/right unit mounting position, and
   wherein the video playback unit further comprises control means for determining whether the video playback unit is connected to the left case or the right case by detecting the electrical terminal for detecting left/right unit mounting position and for controlling the display-element driving means according to the determination result so that an image displayed on the display element is properly oriented vertically and horizontally.

3. A head-mounted audio/video playback system comprising:
   (i) a main-body unit comprising:
      a left case comprising a left speaker and a unit-connection terminal provided with a plurality of electrical terminals;
      a right case comprising a right speaker and a unit-connection terminal having a same configuration as the unit-connection terminal of the left case;
      a coupling unit for integrally coupling the left case and the right case;
      a left audio-signal transmission line for transmitting a left audio signal, which is supplied to the left speaker;
      a right audio-signal transmission line for transmitting a right audio signal, which is supplied to the right speaker; and
      a video-signal transmission line, connected to the electrical terminals included in the unit-connection terminal of the left case and the electrical terminals included in the unit-connection terminal of the right case, for transmitting a video signal;
   (ii) a video playback unit that can be removably connected to one of the left case and the right case of the main-body unit, the video playback unit comprising:
      a display element for displaying images;
      a connection element adapted to be connected to the unit-connection terminals; and
      display-element driving means for driving the display element according to a video signal input from the connection element,
      wherein when the display element is connected to the left case, the display element is positioned in front of a left eye of a user, and when the display element is connected to the right case, the display element is positioned in front of a right eye of the user; and
   (iii) a battery unit comprising:
      a battery; and
      a connection terminal adapted to be connected to the unit-connection terminals and to supply power from the battery,
   wherein the video playback unit is removably attachable to both the left case and the right case to be connected to the corresponding one of the unit connection terminals, and the battery unit is removably attachable to both the left case and the right case to be connected to the corresponding one of the unit connection terminals.

4. The head-mounted audio/video playback system according to claim 3,
   wherein the main-body unit further comprises a power-supply line, connected to the electrical terminals of the unit-connection terminal of the left case and the electrical terminals of the unit-connection terminal of the right case, for supplying power,
   wherein the video playback unit further comprises an input power switching circuit that detects whether the power-supply line can supply power and whether the battery unit can supply power, and
   wherein when both of the power-supply line and the battery unit can supply power, the input power switching circuit stops the power supplied from the battery unit and allows the power to be supplied only from the power-supply line.

* * * * *